United States Patent
Rabideau et al.

(10) Patent No.: US 6,959,287 B2
(45) Date of Patent: Oct. 25, 2005

(54) METHOD AND SYSTEM FOR CONDUCTING A TARGET AUDIT IN A HIGH VOLUME TRANSACTION ENVIRONMENT

(75) Inventors: David W. Rabideau, Alpharetta, GA (US); Kevin D. Brack, Atlanta, GA (US); Sven Johnson, Atlanta, GA (US); Alan Pearlman, Atlanta, GA (US); Judith M. Smick, Jonesboro, GA (US); James Gregory Thomas, Sharpsburg, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 472 days.

(21) Appl. No.: 09/892,604

(22) Filed: Jun. 27, 2001

(65) Prior Publication Data

US 2002/0010664 A1 Jan. 24, 2002

Related U.S. Application Data

(60) Provisional application No. 60/219,042, filed on Jul. 18, 2000.

(51) Int. Cl.[7] .............................................. G06F 17/60
(52) U.S. Cl. .............................. 705/30; 705/7; 714/48; 707/104.1; 707/4
(58) Field of Search ........................... 705/30, 34, 7; 714/37, 48, 49; 707/104.1, 2, 3, 4, 5

(56) References Cited

U.S. PATENT DOCUMENTS

| | | | | |
|---|---|---|---|---|
| 4,621,325 A | * | 11/1986 | Naftzger et al. | 705/30 |
| 4,862,357 A | | 8/1989 | Ahlstrom et al. | |
| 4,933,848 A | * | 6/1990 | Haderle et al. | 707/201 |
| 5,058,113 A | * | 10/1991 | Burnham et al. | 714/25 |
| 5,221,830 A | * | 6/1993 | Kern | 705/30 |
| 5,404,509 A | * | 4/1995 | Klein | 707/101 |
| 5,770,844 A | * | 6/1998 | Henn | 235/380 |
| 5,842,180 A | * | 11/1998 | Khanna et al. | 705/30 |
| 5,895,453 A | | 4/1999 | Cook | |
| 5,960,422 A | * | 9/1999 | Prasad | 707/2 |
| 6,029,144 A | * | 2/2000 | Barrett et al. | 705/30 |
| 6,035,295 A | * | 3/2000 | Klein | 707/6 |
| 6,278,989 B1 | * | 8/2001 | Chaudhuri et al. | 707/2 |
| 6,442,533 B1 | * | 8/2002 | Hinkle | 705/35 |
| 6,477,534 B1 | * | 11/2002 | Acharya et al. | 707/100 |
| 6,728,720 B1 | * | 4/2004 | Lenzie | 707/101 |
| 2002/0138376 A1 | * | 9/2002 | Hinkle | 705/30 |

FOREIGN PATENT DOCUMENTS

JP          63311566 A  * 12/1988  .......... G06F/15/28

OTHER PUBLICATIONS

DeSouza, Glenn R., "A strategic model of price, quality and value", Journal of Applied Business Research, v9n1, p. 50–59, Winter 1992–1993.*
International Search Report for PCT Patent Application No. PCT/US01/41166, issued by European Patent Office on Nov. 13, 2003.
R. McClatchey et al., "The Architecture of a Computerised Reservation System Integrated Using an 'Active' Database," 1995 IEEE, pp. 138–147.

* cited by examiner

Primary Examiner—F. Zeender
(74) Attorney, Agent, or Firm—King & Spalding LLP

(57) ABSTRACT

A target audit methodology to provide a transaction-based detail of errors in an environment with a high volume of transactions. The primary components comprise a distributed computer network, such as the global Internet, coupled to numerous databases and a workstation. A Random Sample Query is used to pull a statistically valid sample from a general population of transactions to identify initial transaction errors. The initial transaction errors are analyzed to determine parameters for identifying other similar errors with a high probability of occurrence within the total population of transactions. A Possible Error Query is designed to retrieve these specific error types and is processed against the population of transactions. The results of the Possible Error Query are assigned financial impact and detailed for the client by individual transaction in an invoice.

12 Claims, 18 Drawing Sheets

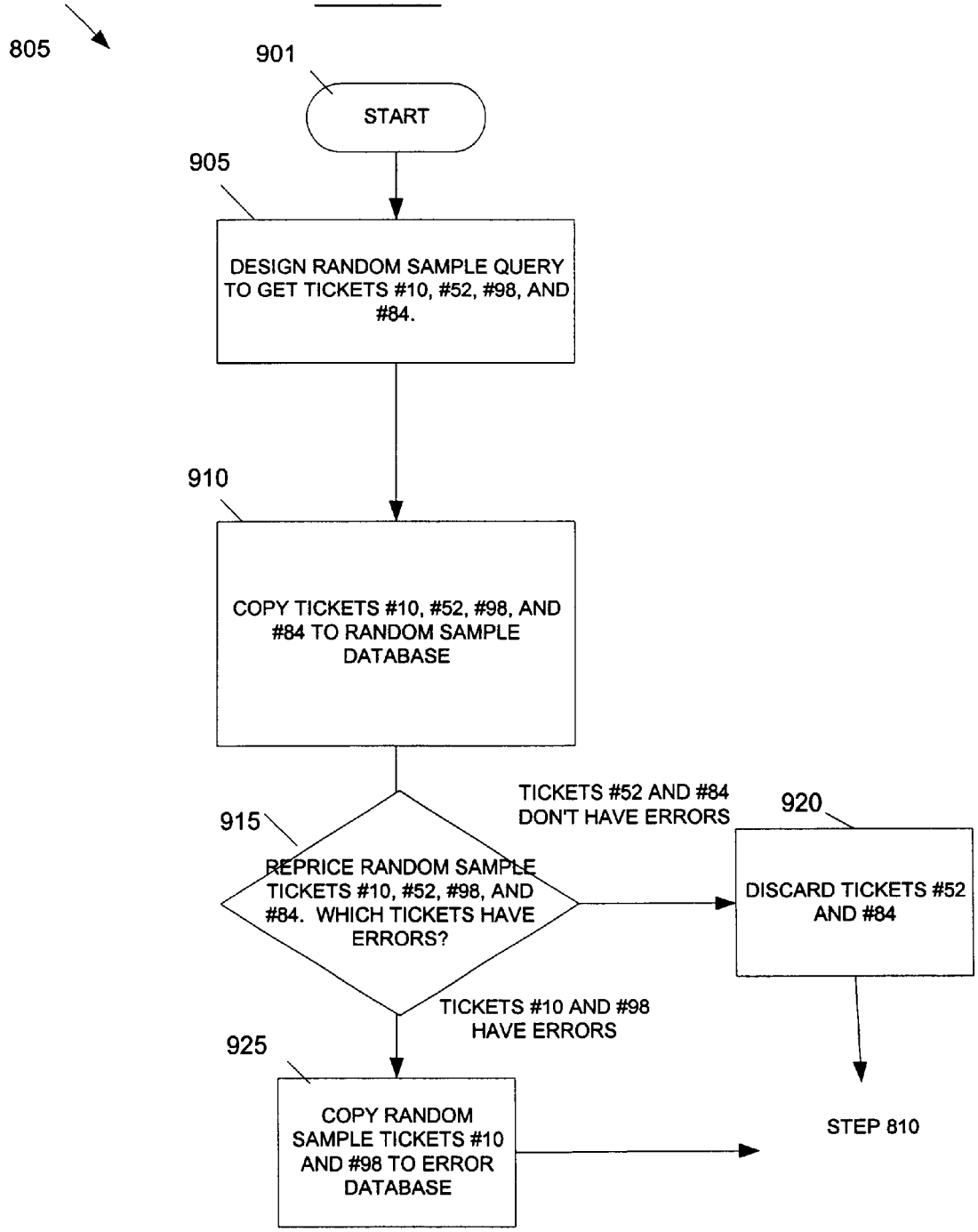

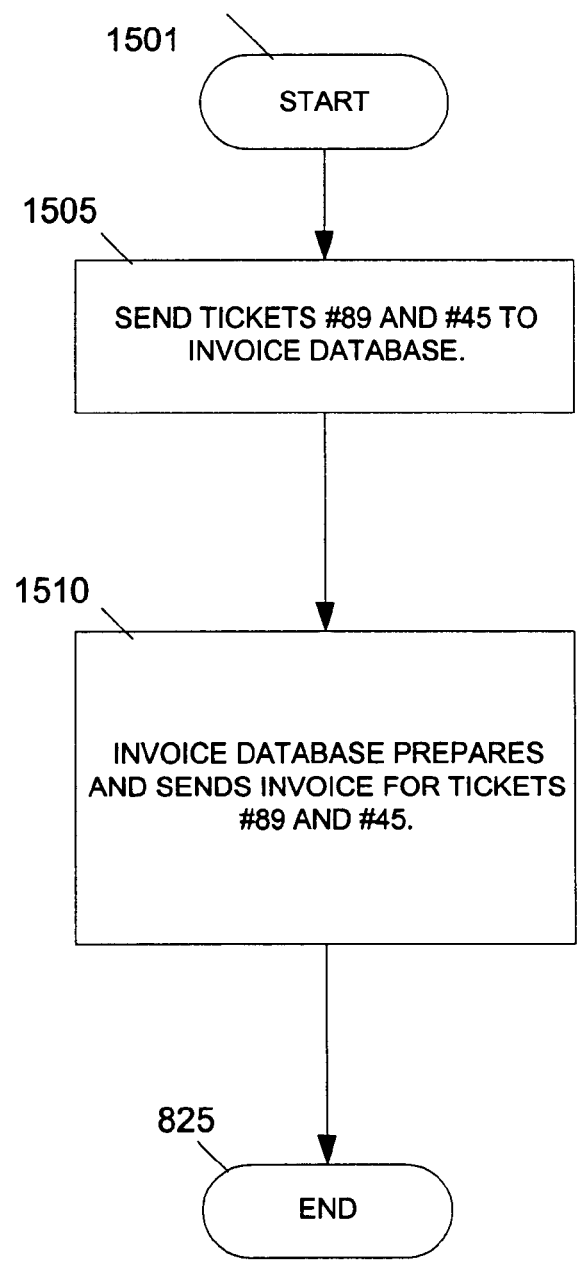

| | |
|---|---|
| △ DELTA AIR LINES | Memo Number  8960  006887  CK 6 — 1605 |
| | Memo Date  4Jan2001 — 1610 |
| Delta Air Lines, Inc  Collections - Dept. 855 P.O. Box 101591  Atlanta, GA 30392-1591  Fax: | Agency Number  11-11111 — 1615 |
| | Ticket Number  0009876543210 — 1620 |
| | Date of Ticket Validation  3Jan2001 — 1625 |
| Payment is due upon receipt of this memo. Detach the stub and include it with your next sales report in the full amount shown below. If you have documentation which would cancel or revise this charge, indicate the reason and return along with all documents to the address shown above.  Thank you. | Your Report Period Ending  31Dec2000 — 1630 |
| | Passenger  John Smith — 1635 |

Reason for Memo:
Frbk 00 Reported commission is greater than expected commission.

Replacement Fare | Print Number 1 Original  Issuing Unit mhuggah AUDT

Correct Computation

| From/To | Via | Fare |
|---|---|---|
| | | 0.00 |
| | | |
| | | |
| | | |
| | | |
| | | R |
| Total | | 0.00 |

— 1640

| | Fare | Tax | Commission | Service Charge | Total |
|---|---|---|---|---|---|
| Our Computation | 0.00 | | 35.00 | 0.00 | -35.00 |
| Your Computation | 0.00 | | 50.00 | | -50.00 |
| Difference USD | 0.00 | 0.00 | -15.00 | 0.00 | 15.00 |

— 1645

---

IMPORTANT
Please return this stub with your next Sales Report to the area bank to identify payment. Thank you.

Debit Memo

| Memo Date | Amount |
|---|---|
| 4Jan2001 | USD 15.00 |

△ DELTA AIR LINES

| Form | Serial Number | CK | Airline | Agency Number |
|---|---|---|---|---|
| 8960 | 006887 | 6 | 006 | 11-11111 |

XYZ TRAVEL AGENCY
SUITE 100
1000 CORPORATE CENTER DRIVE
ATLANTA, GA 30319-5367

| Ticket Number |
|---|
| 0009876543210 |

— 1650

METHOD AND SYSTEM FOR CONDUCTING A TARGET AUDIT IN A HIGH VOLUME TRANSACTION ENVIRONMENT

RELATED APPLICATION

This application claims priority under 35 U.S.C. 119 to U.S. Provisional Patent Application 60/219,042, filed on Jul. 18, 2000, entitled "Target Audit in High Volume Transaction Environment", which is hereby fully incorporated herein by reference.

FIELD OF THE INVENTION

The present invention relates to the auditing of transactions. More specifically, the invention relates to the auditing of ticket sales in a high volume transaction, such as the airline industry.

BACKGROUND OF THE INVENTION

Airlines sell seats on flights according to the date of travel, itinerary (origin and destination), fare basis, and class of service. These seats are sold direct by the airline or indirectly through travel agencies. Confirmation is provided to the passenger by the issuance of a ticket (either paper or electronic). The price of the tickets vary and depend on various factors, including market competition, the class of service, and the advance purchase of the transaction. The rules surrounding the variable prices are specified in a fare basis code, and filed by the carriers with the Airline Tariff Publishing Company (ATPCo). The prices or fares are published and distributed through several global reservation systems and accessed by agents to provide fare quotes, create reservations, and generate tickets.

Airline travel has become increasingly popular, and consequently there has been a marked increase in the volume of tickets sales. The time and effort devoted to processing and capturing ticket sales has been automated as technology has become available. The reservation systems provide agents with the ability to generate tickets through the autopriced mode or the manually priced mode. The autopriced mode provides the ticket for the straight published fare. No exceptions or discounts are available. Tickets sold using the autopriced mode are system-generated, and therefore guaranteed by the reservation system to be accurate as published. Tickets sold using the manually priced mode are agent-generated and not guaranteed by the reservation system. Corporate discounts or other discounts are available using the manually priced mode. In the manually priced mode, the ticketing agents have the ability to override the rules and terms of a particular ticket. This ability is a revenue loss risk to the airlines because the agents can sell tickets for less than the correct price. Because of the technology used in the manual process, this revenue loss risk is not preventable at the point of sale. Thus, there is a need to audit the accuracy of the ticket after the sale is processed and recorded in the airline's ticket database. The auditing process helps police the system to ensure that the rules are being enforced and inaccurate tickets are identified.

Auditing processes have been developed to systematically determine compliance with rules. Within the airline industry, auditing consists of repricing the transactions. Because numerous rules need to be checked, the process of repricing can be very time consuming. Errors identified in the audit process result in notification to the entity responsible for the transaction. Within the airline industry, the rules include ticketing and fare rules, and the error notification is often called an invoice or debit memo. The invoice calculates the value of the loss and requests payment. Current auditing processes have allowed airlines to recover revenue that would otherwise be lost. However, these auditing processes are inadequate in several ways. First, the number of tickets and the amount of detail on each ticket is too large for the system to handle, so tickets are continually backlogged in the audit program. In addition, the complexities of some contracts cannot be accommodated with existing audit processes, therefore these contracts are not audited and are skipped entirely. Furthermore, incorrect invoices can be produced by the auditing process. The incorrect invoices are often caused by contracted corporate fares that are not subject to the published tariff rules, and are not recognized by the audit program. The incorrect invoices create additional work for the agent and the airlines by generating correspondence and phone calls in efforts to resolve the problem. The incorrect invoices also create bad will with the agents, and cause the integrity of the audit program to be questioned. An additional problem of the auditing program is a maintenance problem. Maintenance of the audit system is additional to the maintenance of the fares and contract database systems.

In an effort to minimize the number of tickets audited, minimize the incorrect invoices, enhance client service and ensure recovery of lost revenue, an alternative audit system was introduced. The alternative program was named FARE, which represented the philosophy behind the program: to provide a Fair Audit of agency issued transactions and Revenue Enhancement for the recovery of lost revenues due to ticketing errors. This audit process could be applied to agencies generating a large volume of tickets each month. The FARE audit made it possible to not have to audit each individual ticket, which was overwhelming when a large number of tickets were sold. The large volume would support an audit on a sample of transactions and allow for conclusions to be drawn and applied to the population as a whole, instead of to just a percentage of transactions. Determining ticketing quality derived from a sample would provide benefits to both the airlines and the agents by allowing for a reduction in the volume of tickets processed through the audit program, and provide the agent with audit results at an overall summary level versus individual invoices to be process and paid. The results of the audit include the calculation of financial impact that is utilized for determining financial settlement.

Although the FARE audit minimized the number of tickets audited, minimized the incorrect memos, enhanced client service, and ensured recovery of some lost revenue, the FARE audit also had drawbacks. Because the FARE audit is based on a sample, while statistically valid, it did not provide enough detailed information for the agent to collect error fees from its clients for the errors made in ticketing. For example, the FARE audit generated an invoice that indicates that an agent owed $4500 because certain issued tickets did not meet the terms of the contract. Detailed information on the errors found in the original sample of transactions could be provided. However, detailed information on the errors found in the population as a whole were not available. In addition, supporting documentation to support the validity of the errors in the population as a whole were not available.

In view of the foregoing, there is a need for a process which minimizes the number of tickets audited, minimizes the incorrect memos, enhances client service, ensures recovery of lost revenue, and provides audit detail to support the error fees.

SUMMARY OF THE INVENTION

The present invention can address the needs of the prior art by using a Target audit methodology to efficiently focus on financially substantial errors in transactions while providing the client with the necessary details to prove the errors. The Target audit methodology can be used to provide transaction-based details of errors in an environment with a high volume of transactions.

The primary components of a representative operating environment for the present invention can include: a workstation, a distributed computer network, such as a corporate intranet, coupled to databases, and a query program. The user accesses the workstation to use the query program to design queries and search the databases. The user also uses the workstation to move information throughout the databases.

The databases can hold content and related data from local data sources and remote data sources. The databases can include a Transaction Database, a Random Sample Database, a Random Sample Error Database, a Possible Error Database, and an Error Database. The Transaction Database can contain the population of transactions that will be audited throughout the process. The Random Sample Database can contain Random Sample Transactions, which are copies of a random sample of transactions from the Transaction Database. The Random Sample Error Database can contain Random Sample Error Transactions, which are copies of the Random Sample Transactions that were repriced and found to be incorrect. The repricing information is included in the Random Sample Error Transactions. The Possible Error Database can contain Possible Error Transactions, which are copies of transactions from the Transaction Database that have information similar to the information in the Random Sample Error Transactions. The Error Database can contain Error Transactions, which are copies of Possible Error Transactions which were repriced and found to be incorrect. The Invoice Database can contain the Error Transactions, information required to provide audit reports to airlines and agents, and information necessary to collect funds.

The user can access the query program to design a Random Sample Query, which can pull the Random Sample Transactions, which are a statistically valid sample of transactions derived from the Transaction Database and help the user identify initial transaction errors, referred to as Random Sample Error Transactions. The Random Sample Error Transactions can be analyzed to determine parameters for identifying other similar errors with a high probability of occurrence within the total population of transactions.

A Possible Error Query can be designed to retrieve transactions with similar errors and can be processed against the transactions in the Transaction Database. The results of the Possible Error Query are the Possible Error Transactions. The Possible Error Transactions can be repriced and the errors can be designated Error Transactions. The Error Transactions can be assigned financial impact and detailed for the client by individual transaction in an invoice. This can provide the level of detail the client requires, while proving to be an efficient and accurate process for a business to identify and recover transaction errors. The present invention can ensure that clients are responsible only for actual transaction errors.

While the present invention has been summarized as relating to transactions generally, the representative embodiment will describe an audit of ticket sales in the airline industry. Those experienced in the art will recognize that the present invention can be extended to handle transactions in a wide variety of industries, comprising healthcare, manufacturing, insurance, and financial services. In addition, while the present invention has been described as relating to clients and agents, those experienced in the art will recognize that the present invention can be applied to a wide variety of entities, including agencies and other types of organization.

While the above invention has been described with several manual functions, those experienced in the art will also recognize that these manual functions could be automated. For example, the Random Sample Query and the Possible Error Query can be automated. In addition, instead of just one Random Sample Query and one Possible Error Query, multiple queries can be used.

BRIEF DESCRIPTION OF THE DRAWINGS

FIG. 9 is a logical flowchart diagram illustrating an exemplary process for obtaining the Random Sample Error Tickets.

FIG. 10B is an exemplary display screen illustrating a representative example of the tickets pulled by the Random Sample Query.

FIG. 11 is an exemplary display screen illustrating an analysis of a Random Sample Ticket Errors and the use of this analysis to design the Random Sample Query.

FIG. 13B is an exemplary display screen illustrating a representative example of the tickets pulled by the Possible Error Query.

FIG. 15 is a logical flowchart diagram illustrating the preparation of a detailed invoice for Error Tickets.

FIG. 16 is a display screen illustrating an exemplary individual invoice record.

DETAILED DESCRIPTION OF EXEMPLARY EMBODIMENTS

Figure 1:
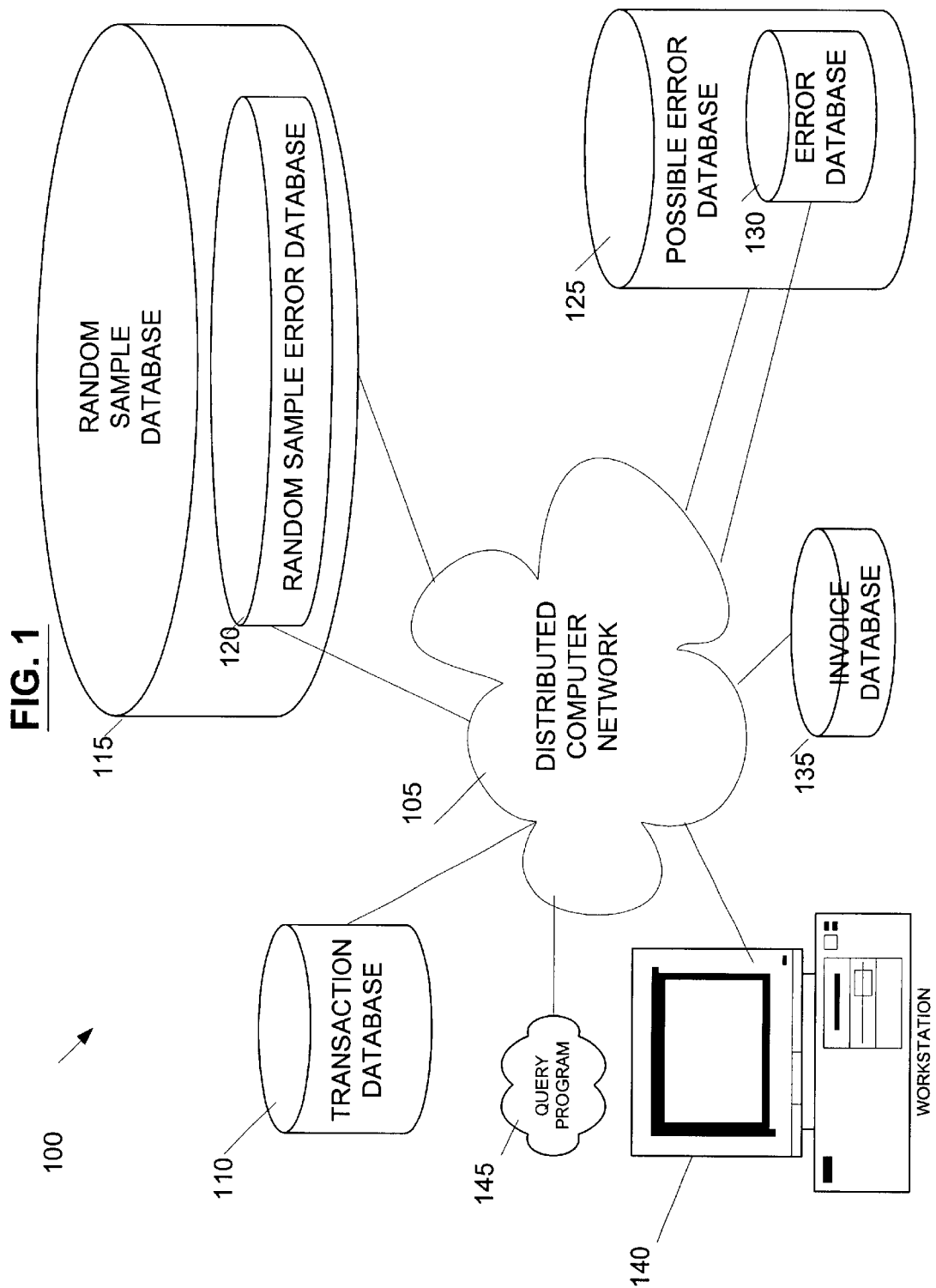
FIG. 1 is a block diagram illustrating the primary components of a representative operating environment for a target audit methodology in an exemplary embodiment of the present invention.

The present invention provides a transaction-based detail of errors in an environment with a high volume of transactions. The present invention addresses the needs of the prior art by using a target audit methodology to efficiently focus on financially substantial errors in transactions while providing the client with the necessary detail to prove the errors. The target audit methodology is used to provide transaction-based detail of errors in an environment with a high volume of transactions.

The primary components of a representative operating environment for an exemplary embodiment of the present invention include: a distributed computer network 105, such as the global Internet, coupled to numerous databases 110–135, a query program 145, and a workstation 140.

The databases hold content and related data from local data sources and remote data sources. The databases include a Transaction Database 110, a Random Sample Database 115, a Random Sample Error Database 120, a Possible Error Database 125, and an Error Database 130. The Transaction Database 110 contains the population of detailed transactions that will be audited throughout the process. The Random Sample Database 115 contains Random Sample Transactions, which are copies of a random sample of transactions from the Transaction Database 110. The Random Sample Error Database 120 contains Random Sample Error Transactions, which are copies of the Random Sample Transactions that were checked and found to be incorrect. The incorrect information is included in the Random Sample Error Transactions. The Possible Error Database 125 contains Possible Error Transactions, which are copies of transactions from the Transaction Database 110 that have information similar to the information in the Random Sample Error Transactions. The Error Database 130 contains Error Transactions, which are copies of Possible Error Transactions which were checked and found to be incorrect. The repricing information is included in the Error Transactions. The Invoice Database 135 contains Error Tickets and information required to provide audit reports.

The workstation 140 is accessed by the user to move information between the databases. A user accesses the workstation 140 and the query program 145 to design queries to search the databases. An exemplary embodiment of the present invention uses the query program 145 to create a Random Sample Query and a Possible Error Query. A representative query program that can be used with an exemplary embodiment is Brio Technology, Inc.'s "BRIO" computer query programs. Those experienced in the art will appreciate that other query programs can also be used.

The Random Sample Query pulls a statistically valid sample derived from a general population of transactions to identify initial transaction errors. The initial transaction errors are analyzed for determination of parameters for identifying other similar errors with a high probability of occurrence within the total population of transactions. A Possible Error Query is designed to retrieve these specific error types and processed against the population of transactions. The results of the Possible Error Query are assigned financial impact and detailed for the agent or client by individual transaction in an invoice. This provides the level of detail the agent or client requires, while proving to be an efficient and accurate process for a business to identify and recover transaction errors. This exemplary embodiment ensures that clients are responsible only for actual transaction errors.

While the present invention is described as generally relating to transactions in a high volume transaction environment, the representative example described below is directed to an audit of ticket sales in the airline industry. Thus, reference is made to tickets instead of transactions. Those experienced in the art will recognize that the present invention can be extended to handle transactions in a wide variety of industries, comprising healthcare, manufacturing, insurance, and financial services. In addition, while the present invention has been described as relating to clients and agents, those experienced in the art will recognize that the present invention can be applied to a wide variety of entities, included agencies and other types of organization.

While an exemplary embodiment is described with several manual functions, those experienced in the art will recognize that these manual functions could be automated. For example, the Random Sample Query and the Possible Error Query could be automated. In addition, instead of just one Random Sample Query and one Possible Error Query, multiple queries of each type could be used.

Primary Components

Turning now to the Figures, in which like reference numbers are assigned to like elements, FIG. 1 is a block diagram illustrating the primary components of a representative operating environment for an exemplary embodiment of the present invention. An on-line environment 100 comprises a distributed computer network 105, such as a corporate intranet or the global Internet, coupled to databases 110–135, a workstation 140, and a query program 145.

The databases 110–135 hold content and related data from local data sources and remote data sources. The databases include the Ticket Database 110, the Random Sample Database 115, the Random Sample Error Database 120, the Possible Error Database 125, the Error Database 130, and the Invoice Database 135.

The Ticket Database 110 contains the population of tickets that will be audited throughout the process. The tickets contain detailed information, including ticket records for all passenger sales issued by an agent. The detail for each ticket is stored to allow for an efficient and consistent audit. The ticket information is stored and reconciled with usage information once travel has occurred. The population is defined by a predetermined set of criteria such as ticket issue date range and ticketing entity. The coupon level reflects the detail of each flight segment that comprises the complete ticket. Coupon usage is any action against an individual coupon subsequent to the original sale, such as flown, refund, or exchange. The Ticket Database 110 is used to copy the tickets for use in the other databases 115–135.

The Random Sample Database 115 contains Random Sample Tickets, which are copies of a statistically valid sample of tickets derived from the Ticket Database 110. The Random Sample Tickets are used to identify initial errors, referred to as Random Sample Error Tickets, so that a query can be developed to find similar errors.

The Random Sample Error Database 120 contains Random Sample Error Tickets, which are copies of the Random Sample Tickets from the Random Sample Database 115 that were repriced and found to be incorrect. The Random Sample Error Tickets can be analyzed to determine parameters for identifying other similar errors with a high probability of occurrence within the total population of tickets. The Random Sample Error Tickets also include repricing information, such as error types and associated attributes.

This allows for maximum flexibility to customize audits based on any specific combination of error attributes.

The Possible Error Database 125 contains Possible Error Tickets, which are copies of tickets from the Ticket Database 110 that have information similar to the information in the Random Sample Error Tickets.

The Error Database 130 contains Error Tickets, which are copies of Possible Error Tickets which were repriced and found to be incorrect. The Error Tickets also contain the repricing information, such as error type, associated attributes, and financial impact. The Error Database 130 will be used to provide reports of audit results to internal and external clients.

The Invoice Database 135 contains Error Tickets and information necessary to provide audit reports to airlines and agents. This information is used to generate invoices so that funds can be collected.

A user accesses the workstation 140 and the query program 145 to design queries to search the databases. The workstation 140 is also accessed by the user to move information between the databases.

Target Audit Methodology

Figure 2:
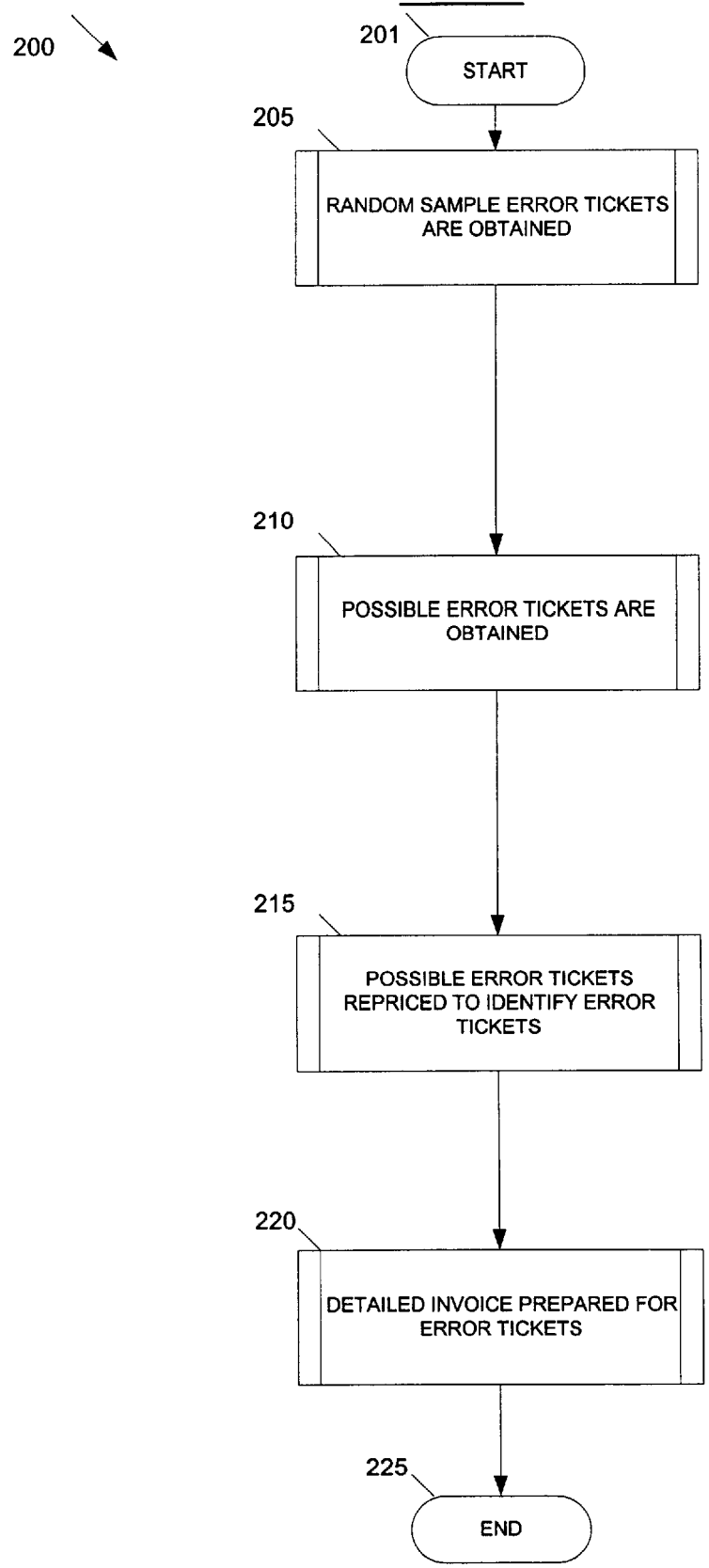
FIG. 2 is a logical flowchart diagram illustrating an overview of an exemplary process for auditing ticket sales in the airline industry using a target audit methodology.

FIG. 2 is a logical flowchart diagram illustrating an overview of an exemplary process for auditing ticket sales in the airline industry using a target audit methodology. Turning now to FIG. 2, the exemplary process 200 is initiated at the START step 201. In step 205, Random Sample Error Tickets are obtained. In step 210, Possible Errors Tickets are obtained. In step 215, Possible Error Tickets are repriced to identify actual Error Tickets. In step 220, detailed invoices are prepared to recoup the revenue lost from the Error Tickets. The exemplary process 200 terminates at the END step 299.

Figure 3:
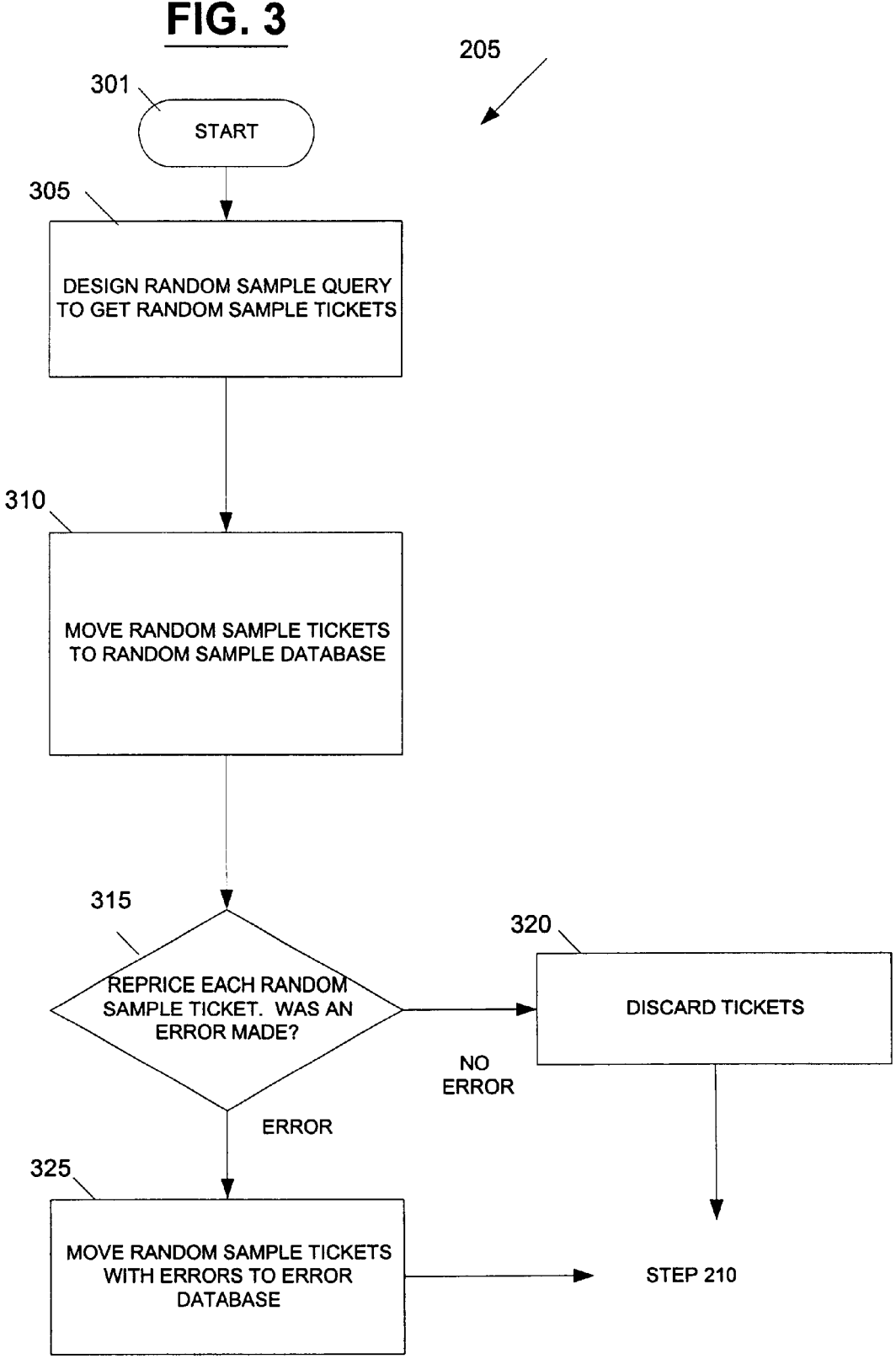
FIG. 3 is a logical flowchart diagram illustrating an exemplary process for obtaining the Random Sample Error Tickets.

FIG. 3 is a logical flowchart diagram illustrating an exemplary process for obtaining the Random Sample Error Tickets, as set forth in step 205 of FIG. 2. Turning now to FIG. 3, the exemplary process 205 is initiated at the START step 301. In step 305, the user accesses the workstation 140 to design a Random Sample Query. The Random Sample Query is designed by the user to find the Random Sample Tickets. The user access the query program to design the Random Sample Query. For example, the user can design the Random Sample Query to get all tickets that match any of the following criteria: Flight 367, 587, 863, Travel Agency X, Travel Agency Y, Travel Agency Z. In step 310, the user accesses the workstation 140 to move the Random Sample Tickets found by the Random Sample Query to the Random Sample Database 115. In step 315, the user accesses the workstation 140 to reprice each Random Sample Ticket to determine if a pricing error was made. Repricing is done by looking at the ticket and the rules that applied to the ticket to see if the rules were applied correctly. For example, if a ticket were sold from Atlanta to Boston on a contracted fare of $300, during repricing, the user would go to the contract rules and look up the terms for the appropriate contract to make sure those rules applied, then the user would go the fare rules available for Atlanta to Boston so see if the appropriate fare was applied, and then the user would go to the commission rules to see if the correct commission was charged. Because numerous rules need to be checked, the process of repricing can be complicated and time consuming.

If there is not an error, the user accesses the workstation 140 to discard the ticket, as set forth in step 320. The process then moves to step 210 of FIG. 2. If there is an error, the user accesses the workstation 140 to move the Random Sample Ticket with the error information (together comprising the Random Sample Error Tickets) from the Random Sample Database 115 to the Random Sample Error Database 120, as set forth in step 325. The process then moves to step 210 of FIG. 2.

Figure 4:
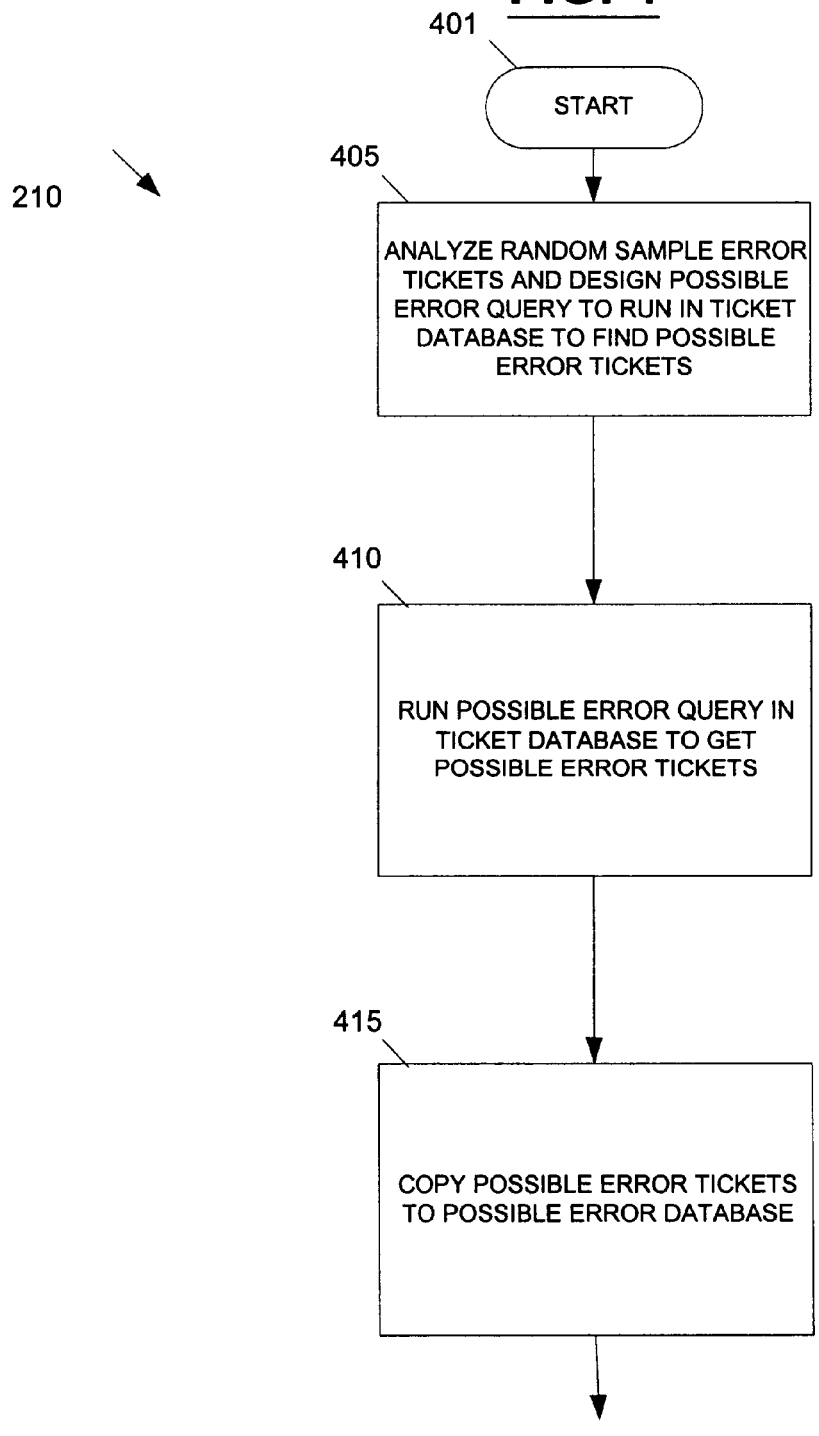
FIG. 4 is a logical flowchart diagram illustrating an exemplary process for obtaining the Possible Error Tickets.

FIG. 4 is a logical flowchart diagram illustrating an exemplary process for obtaining the Possible Error Tickets, as set forth in step 210 of FIG. 2. Turning now to FIG. 4, the exemplary process 210 is initiated at the START step 401. In step 405, the user accesses the workstation 140 to analyze the Random Sample Error Tickets in the Random Sample Error Database 120 and designs a Possible Error Query to run in the Ticket Database 110 to find Possible Error Tickets. The Possible Error Query is designed by the user to find the Possible Error Tickets. The user access the query program to design the Possible Error Query. The user designs the Possible Error Query by identifying error parameters in the Random Sample Error Tickets and designing a query to identify similar parameters in the Ticket Database 110. For example, if a ticket in the Random Sample Error Database 120 indicates that Travel Agency X charged the wrong commission for a sale, the query could be designed to find the commission rate of all tickets issued by Travel Agency X to put in the Possible Error Database 125. Several Possible Error Queries can be run, and these can be designed so that the same tickets are not pulled and repriced twice for the same reason. For example, when a first Possible Error Query pulls all the tickets from Atlanta to Boston, a second Possible Error Query could build upon this first Possible Error Query by finding all tickets issued by Agency X that are not from Atlanta to Boston. The Possible Error Query can also be designed by prioritizing the errors found in the error parameters. Errors can be prioritized by financial impact, frequency of error types, special program audits or difficulty of audit. For example, advance purchase errors normally result in high dollar impact and are easily identified and validated. Thus, the Possible Error Query could be designed to find the high dollar impact errors first.

In step 410, the user accesses the workstation 140 to run the Possible Error Query in the Ticket Database 110 to find the Possible Error Tickets. The Possible Error Tickets are tickets found by the Possible Error Query with parameters similar to the error parameters identified in the Random Sample Error Tickets. In step 415, the user accesses the workstation 140 to put a copy of the Possible Error Tickets in the Possible Error Database 125. This allows for maximum flexibility to customize audits based on any specific combination of error attributes. These tickets might have errors similar to errors found in the tickets in the Random Sample Error Database 120. The process then moves to step 215 of FIG. 2.

Figure 5:
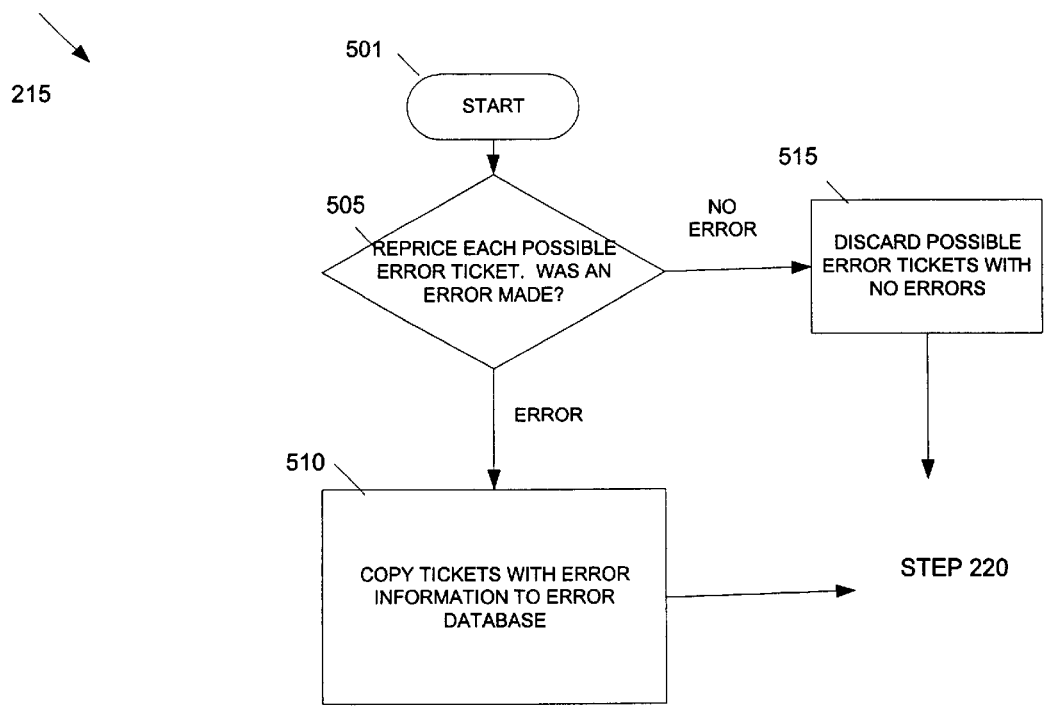
FIG. 5 is a logical flowchart diagram illustrating an exemplary process for repricing the Possible Error Tickets and identifying the Error Tickets.

FIG. 5 is a logical flowchart diagram illustrating an exemplary process for repricing the Possible Error Tickets and identifying the actual Error Tickets, as set forth in step 215 of FIG. 2. Turning now to FIG. 5, the exemplary process 215 is initiated at the START step 501. In step 505, the user accesses the workstation 140 to reprice the Possible Error Tickets in the Possible Error Database 125. This repricing is done to validate specific error criteria, although these same tickets could be involved in additional repricing using different criteria. If there is not an error, the user accesses the workstation 140 to discard the ticket, as set forth in step 515. The process then moves to step 220 of FIG. 2. If there is an error, the user accesses the workstation 140 to copy the Possible Error Ticket with the error information to the Error Database 130, as set forth in step 510. The copies of the Possible Error Tickets are combined with the error information to construct the Error Tickets. The process then moves to step 220 of FIG. 2. Modifications to the Possible Error Tickets may be necessary to improve the quality of the audit process. For example, many times agents inadvertently transpose a contract number code, such as entering in contract 321 instead of 123. In such a case, the error is not that the wrong contract rules were applied, but that a typo was entered. Thus, modifications to this ticket to indicate that there was not a pricing error would be helpful.

Figure 6:
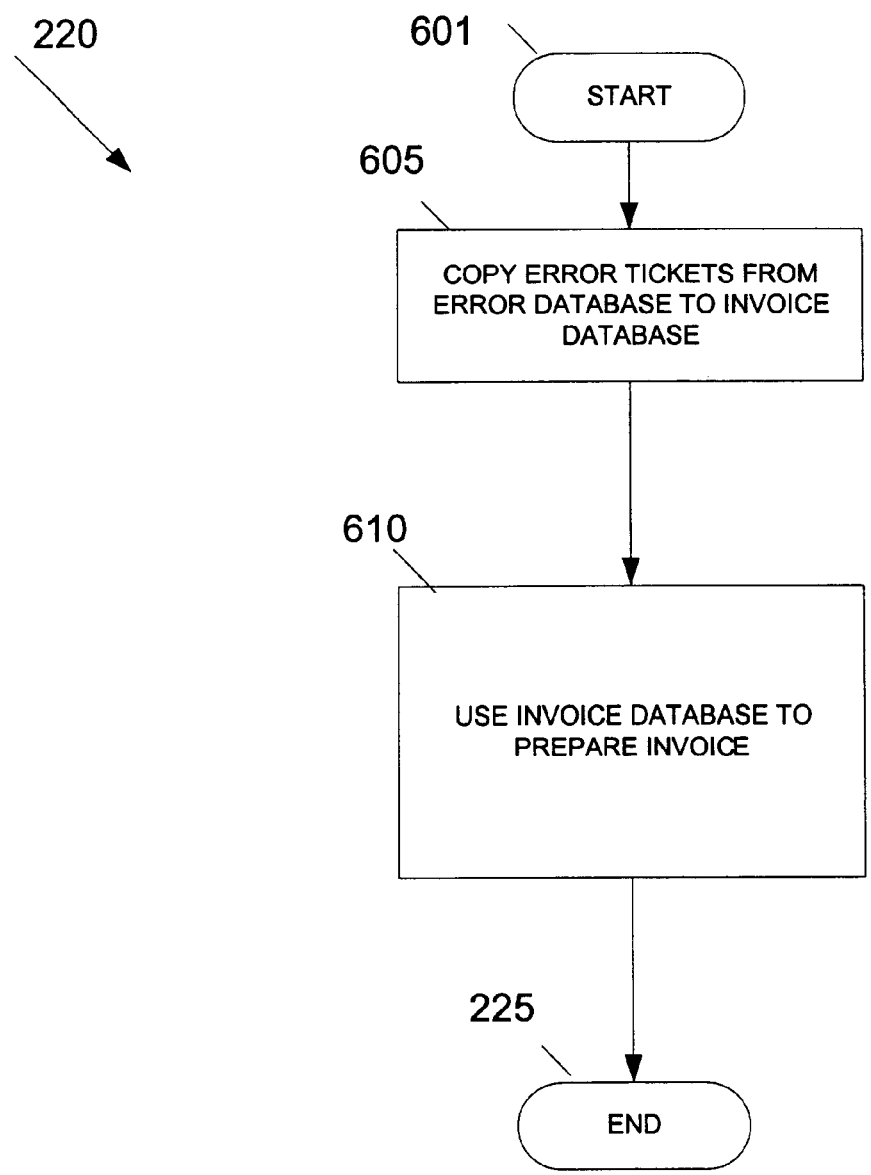
FIG. 6 is a logical flowchart diagram illustrating an exemplary process for preparing and sending a detailed invoice for the Error Tickets.

FIG. 6 is a logical flowchart diagram illustrating an exemplary process for preparing and sending a detailed invoice for Error Tickets, as set forth in step 220 of FIG. 2. Turning now to FIG. 6, the exemplary process 220 is initiated at the START step 601. In step 605, the user accesses the workstation 140 to copy Error Tickets in the Error Database 130 to the Invoice Database 135. In step 610, the user accesses the workstation 140 and the Invoice Database 135 to prepare the invoice. Since the audit results are stored in detail at the ticket level, any desired groupings of the results can be made. The invoices can be created for specific tickets or rolled into a client summary. The invoices provide the level of detail the agent or client requires to prove that underpayments were made, while proving to be an efficient and accurate process to identify and recover revenues lost due to ticketing errors. Before an invoice is created, the Invoice Database 135 is scanned to make sure that an invoice for that ticket number, for that agency number, and for that particular reason code has not been created. The ticket number and agency number are needed to determine the identity of a unique ticket because the ticket numbers are often recycled. If an invoice for that ticket for that particular reason code has already been created, that Error Ticket will be dropped from the Invoice Database 135, and a duplicate invoice will not be created. The process then moves to the "END" step 225 of FIG. 2.

Representative Example

Figure 7:
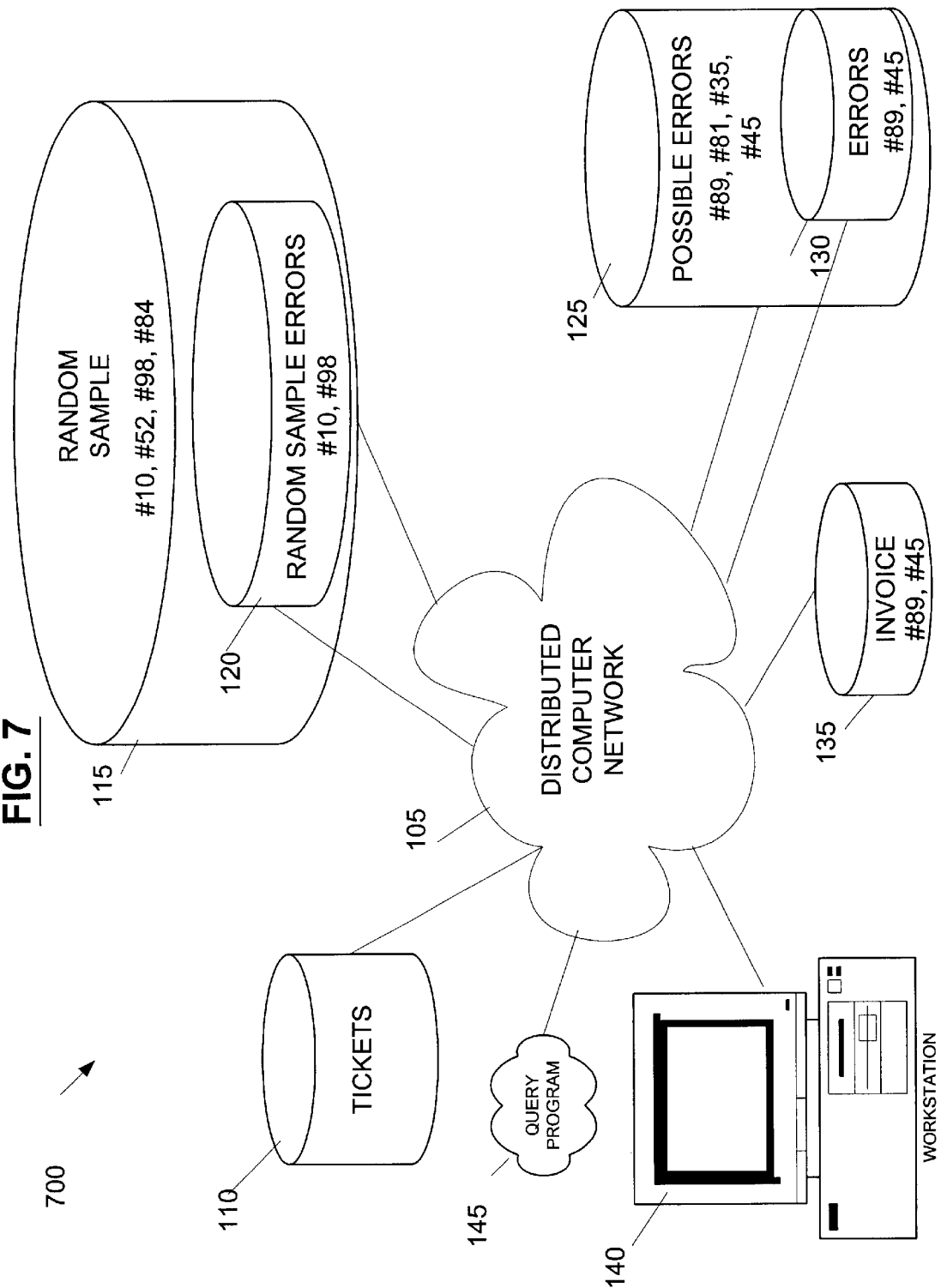
FIG. 7 is a block diagram illustrating the primary components of the operating environment for a representative example of an exemplary target audit methodology.

FIG. 7 is a block diagram illustrating the operation of the primary components of the operating environment for a representative example of an exemplary embodiment of the present invention. An exemplary on-line environment 700 comprises the Internet 105 coupled to the Ticket Database 110, the Random Sample Database 115, the Random Sample Error Database 120, the Possible Error Database 125, the Error Database 130, the Invoice Database 135, the query program 145, and the workstation 140. The Ticket Database 110 contains the population of tickets that will be audited throughout the process. The Random Sample Database 115 contains Random Sample Tickets, which are copies of the Random Sample Tickets that were repriced and found to be incorrect. The Possible Error Database 125 contains Possible Error Tickets, which are copies of tickets from the Ticket Database 110. The Error Database 130 contains Error Tickets. The Invoice Database 135 contains Error Tickets and information required to provide audit reports. A user accesses the workstation 140 and the query program 145 to design queries to search the database. The workstation 140 is also accessed by the user to move information between the databases. The block diagram 700 illustrates how the tickets in the example are moved throughout the databases.

Figure 8:
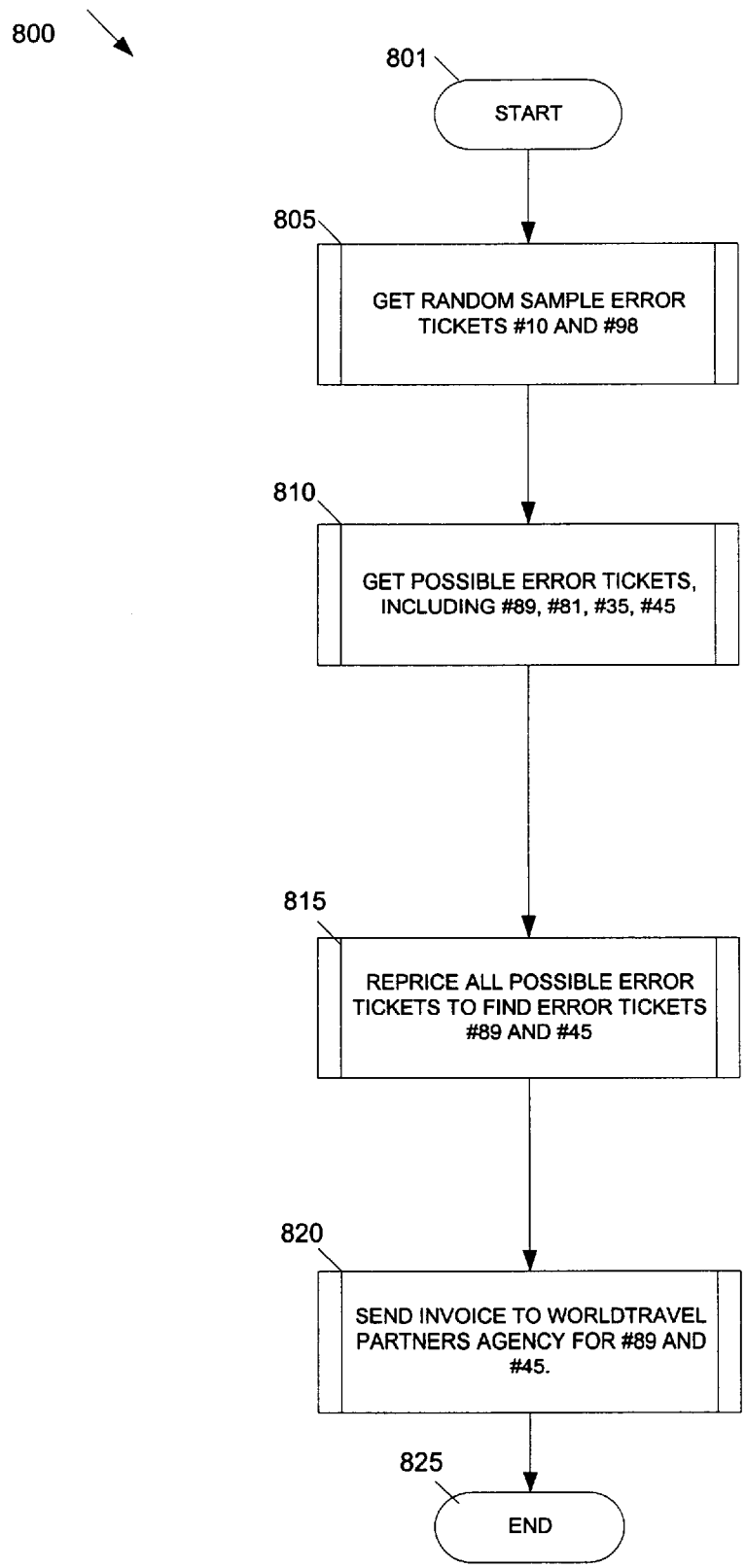
FIG. 8 is a logical flowchart diagram illustrating an overview of a representative example where ticket sales are audited in the airline industry using an exemplary target audit methodology.

FIG. 8 is a logical flowchart diagram illustrating an overview of a representative example where ticket sales are audited in the airline industry using an exemplary target audit methodology. Turning now to FIG. 8, the exemplary process 800 is initiated at the START step 801. In step 805, Random Sample Error Tickets, including #10 and #98 are obtained. In step 810, Possible Error Tickets, including #89, #81, #35, #45 are obtained. In step 815, the Possible Error Tickets are repriced and the actual Error Tickets, including #89 and #45 are identified. In step 220, a detailed invoice is prepared for the XYZ Travel Agency for #89 and #45 and sent to recoup the costs of the errors. The exemplary process 800 terminates at the END step 825.

FIG. 9 is a logical flowchart diagram illustrating a representative example where the Random Sample Error Tickets #10 and #98 are obtained, as set forth in step 805 of FIG. 8. Turning now to FIG. 9, the exemplary process 805 is initiated at the START step 901. In step 905, a Random Sample Query is designed to get a random sample of tickets, which include #10, #52, 98, and #84. The Random Sample Query is designed by a user accessing the workstation 140, as set forth in FIG. 10. The Random Sample Query copies tickets #10, #52, #98, and #84 to the Random Sample Database 115. In step 915, the user accesses the workstation 140 to analyze the Random Sample Tickets in the Random Sample Database 115 to determine if there are any pricing errors. Thus, the user reprices Random Sample Tickets #10, #52, #98, and #84. Random Sample Tickets #52 and #84 are priced correctly, thus the user accesses the workstation 140 to discard #52 and #84, as set forth in step 920. The process then moves to step 810 of FIG. 8. Random Sample Tickets #10 and #98 have errors, thus the user accesses the workstation 140 to copy #10 and #98 from the Random Sample Database 115 to the Random Sample Error Database 120, as set forth in step 925. The process then moves to step 810 of FIG. 8.

Figure 10A:
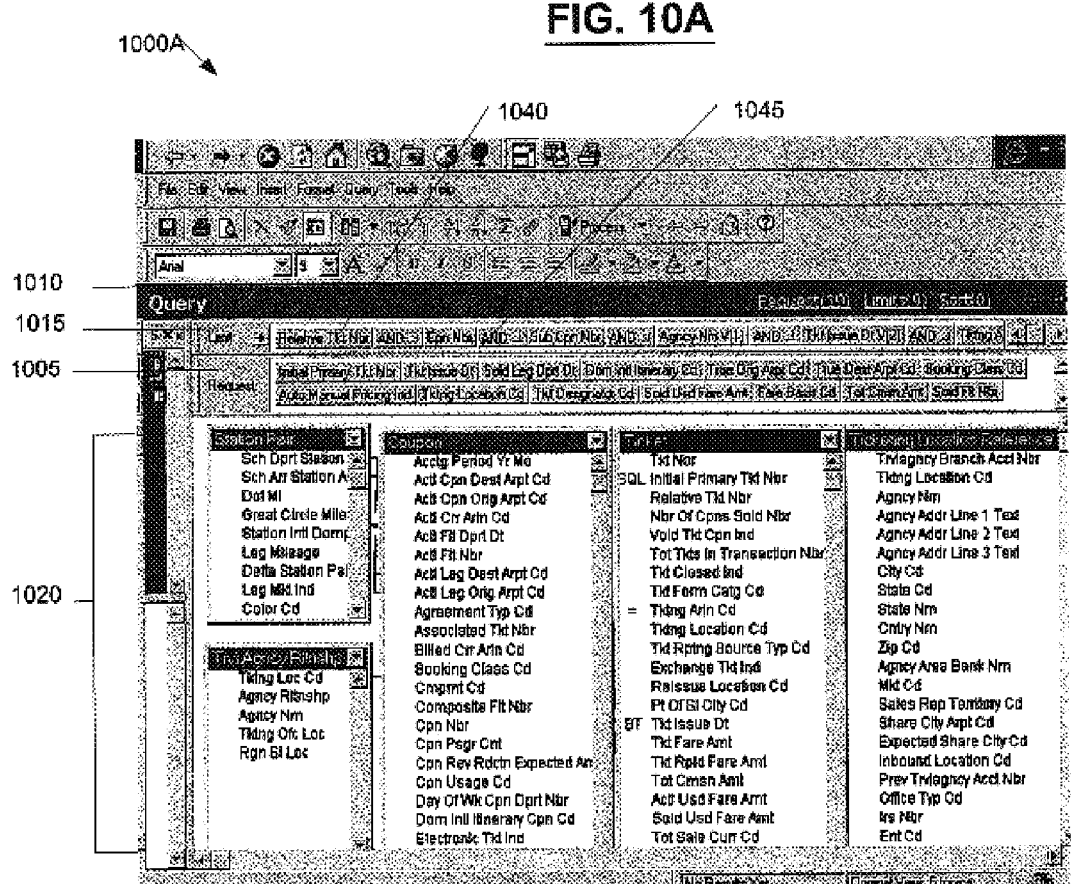
FIG. 10A is an exemplary display screen illustrating a design of the Random Sample Query.

FIG. 10A is an exemplary display screen 1000A illustrating a design of the Random Sample Query. The user chooses the requested parameters and values for those parameters in the Query 1010 from the Request 1005 using the Limit 1015 and the Values 1020. In the exemplary screen shot, the user chooses the requested parameters, which include the values of Relative Ticket Number 1040 and Coupon Number 1045.

Figure 10B:
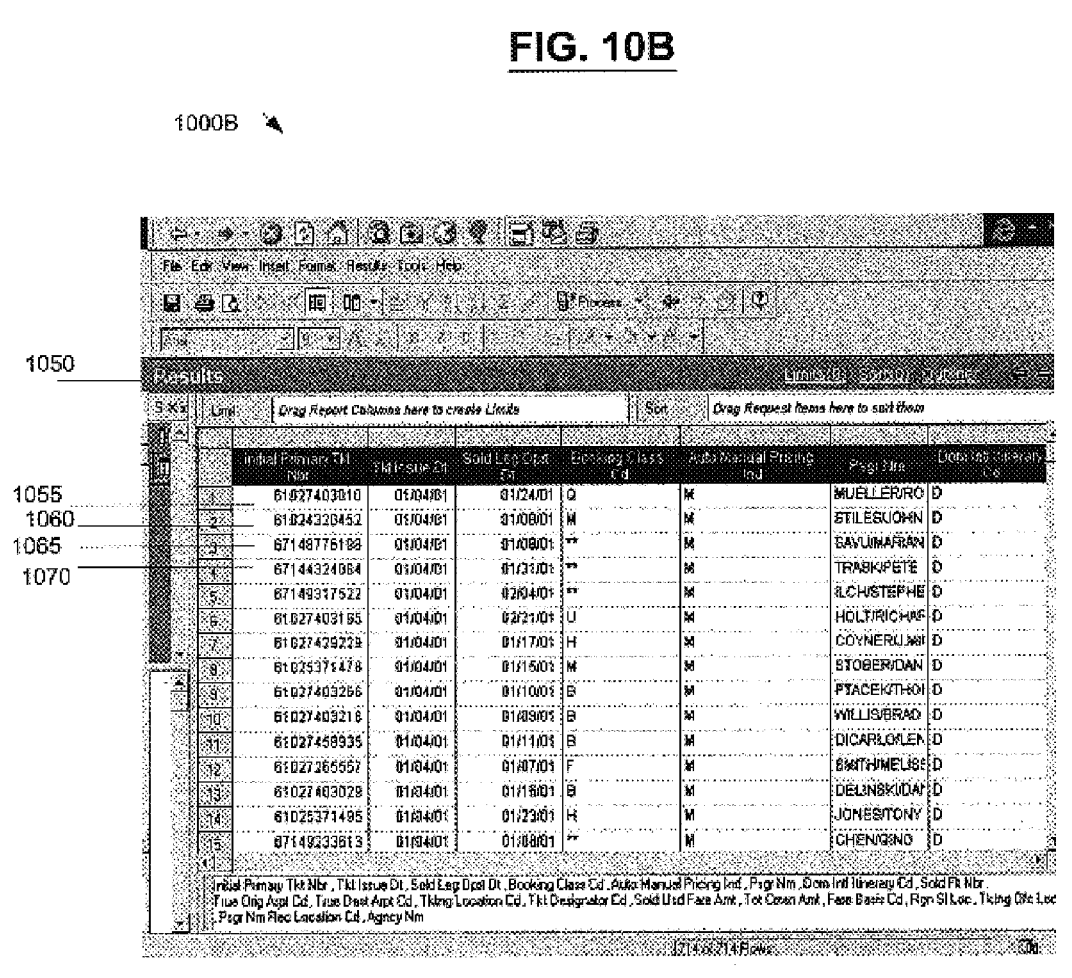

FIG. 10B is an exemplary display screen 1000B illustrating a representative example of the tickets #10, #52, #98, and #84 pulled by the Random Sample Query to be copied to the Random Sample Database 115. The Results 1050 are shown to include ticket #10 1055, ticket #52 1060, ticket #98 1065, and ticket #84 1070. (Only the last two digits of the tickets are indicated. For example, ticket #61027403010 is ticket #10.)

Figure 11:
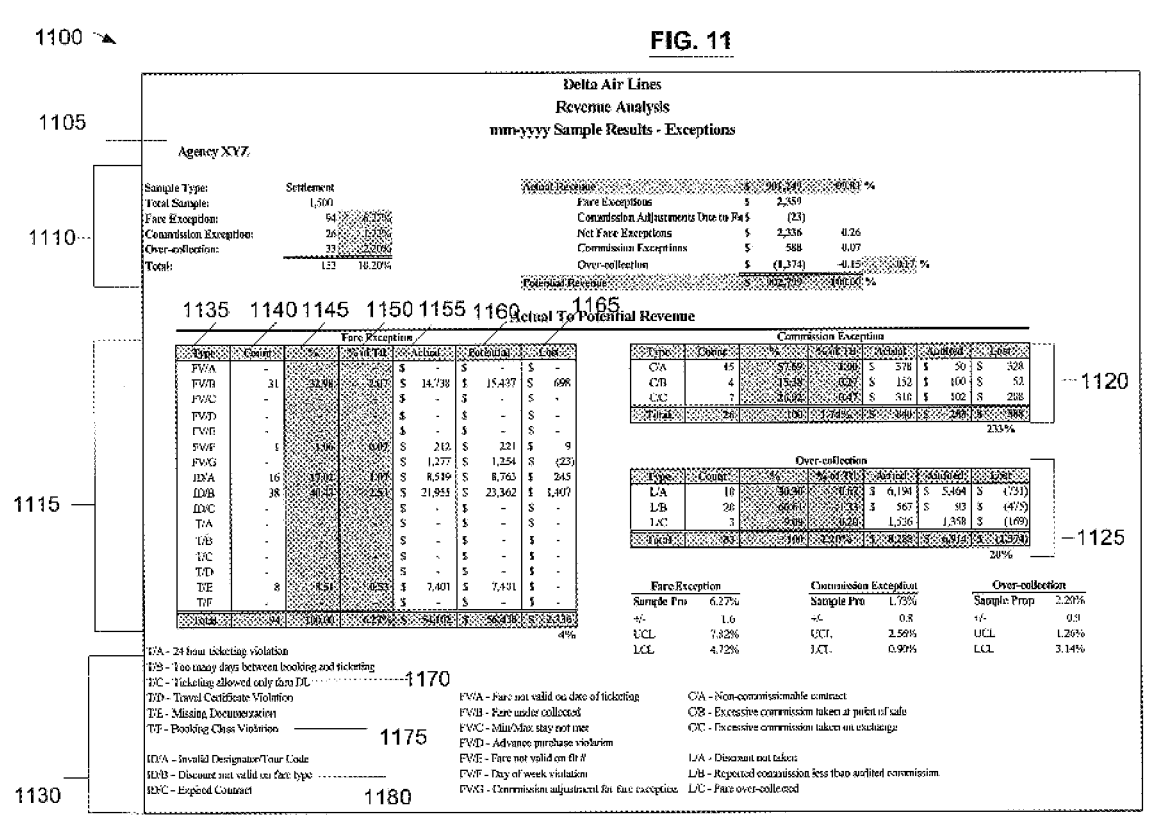

FIG. 11 is an exemplary display screen 1100 illustrating an Audit Results Report that analyzes the repriced Random Sample Tickets to help determine the Possible Error Queries. Repricing can be a very complicated and time consuming process. Repricing is done by looking at the ticket and the numerous rules that applied to the ticket to see if the rules were applied correctly. For example, if a ticket were sold from Atlanta to Boston on a contracted fare of $300, during repricing, the user would go to the contract rules and look up the terms for the appropriate contract to make sure those rules applied, then the user would go the fare rules available for Atlanta to Boston so see if the appropriate fare was applied, and then the user would go to the commission rules to see if the correct commission was charged.

In the example, tickets #10, #52, #98, and #84 are repriced using this process. In the example, tickets #10 and #98 are priced incorrectly, and are thus copied with their error information to become the Random Sample Error Tickets. This error information for tickets #10 and #98, as well as the other Random Sample Error Tickets, is summarized in the Audit Results Report 1100.

The Agent or Agency 1105 is displayed. The results of the repricing are summarized in a Summary 1110. The errors are grouped by Fare Exception 1115, Commission Exception 1120, and Over-Collection 1125. In each of these groups, the Error Type 1135, Count 1140, Percentage 1145, Percentage of Total 1150, Actual Cost 1155, Potential or Audited Cost 1160, and Lost Cost 1165 are listed. The Error Types 1130 are listed so that the user can determine which errors correspond with which revenue loss. The Error Types 1130 include a 24-Hour Ticketing Violation 1170, a Travel Certificate Violation 1175, and an Invalid Designator/Tour Code (ID/A) 1180. In the example, this chart enables the user to see that the greatest source of Lost Cost 1165 was the Error Type ID/A 1180. This Error Type ID/A 1180 was found two times in the Random Sample Error Tickets, as shown in the Count 1140. Although only occurring twice, the ID/A Error Type 1180 caused a Lost Cost of $390, as shown in the Lost Cost 1165. By analyzing the Audit Results Report 1100 this way, the user can pull out the useful information that will help the user find similar substantial errors in the Ticket Database 110.

Figure 12:
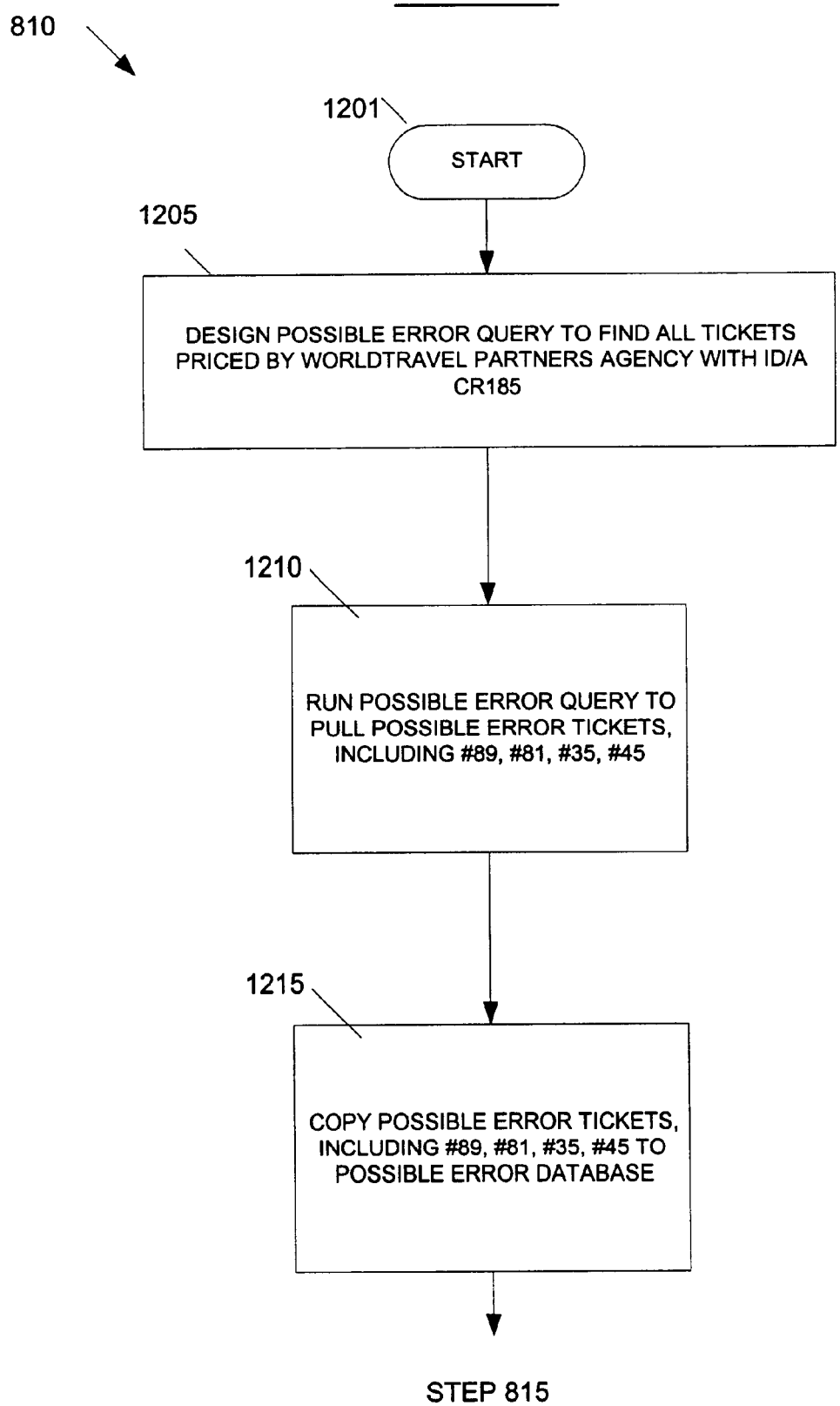
FIG. 12 is a logical flowchart diagram illustrating an exemplary process for obtaining Possible Error Tickets.

FIG. 12 is a logical flowchart diagram illustrating a representative example where the Possible Error Tickets #89, #81, #35, and #45 are obtained, as set forth in step 810 of FIG. 8. Turning now to FIG. 12, the exemplary process 810 is initiated at the START step 1201. In step 1205, the user, using the Audit Results Report 1100, accesses the workstation 140 to design a Possible Error Query to run in the Ticket Database 110 to find Possible Error Tickets. In the example illustrated in FIG. 11, the Audit Results Report 1100 indicates that one source of Lost Cost 1165 for XYZ Travel Agency was an invalid Designator/Tour Code. Examining these two tickets, ticket #10 and #98, it is found that the Designator/Tour Code used was CR 123. To incorporate the information found in the Audit Results Report 1100, the Possible Error Query is designed to find all tickets issued by XYZ Travel Agency with the Designator/Tour Code CR 123. In step 1210, the user accesses the workstation 140 to run the Possible Error Query to find the Possible Error Tickets. The Possible Error Query extracts all the tickets issued by XYZ Travel Agency with the Designator/Tour Code CR 123. These tickets are listed on the display screen in FIG. 13, and include: #89, #81, #35, and #45. In step 1215, the user accesses the workstation 140 to copy #89, #81, #35, #45, and the other Possible Error Tickets to the Possible Error Database 125. The process then moves to step 815 of FIG. 8.

Figure 13A:
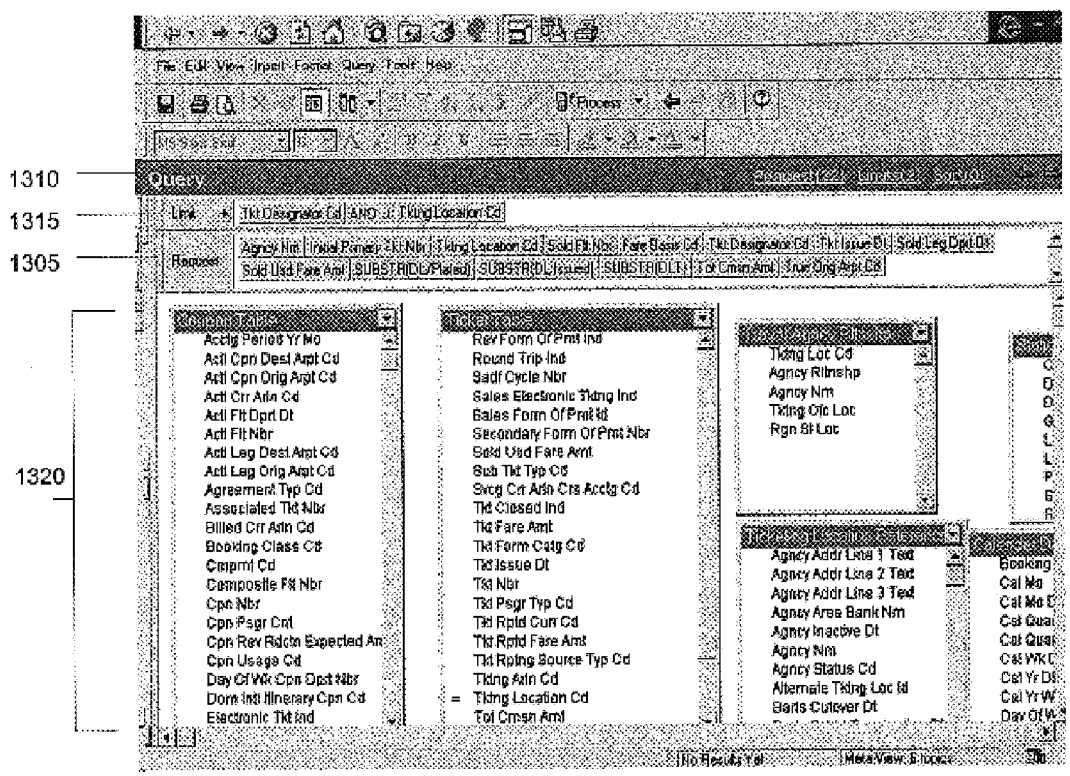
FIG. 13A is an exemplary display screen illustrating a design of the Possible Error Query.

FIG. 13A is an exemplary display screen 1300A illustrating a design of the Possible Error Query. In the exemplary screen shot, the user enters the requested parameters and values of Ticket Designator Code (CR 123) and Ticketing Location Code (11-11111 for XYZ Travel Agency) in the Request 1305 and Values 1320.

Figure 13B:
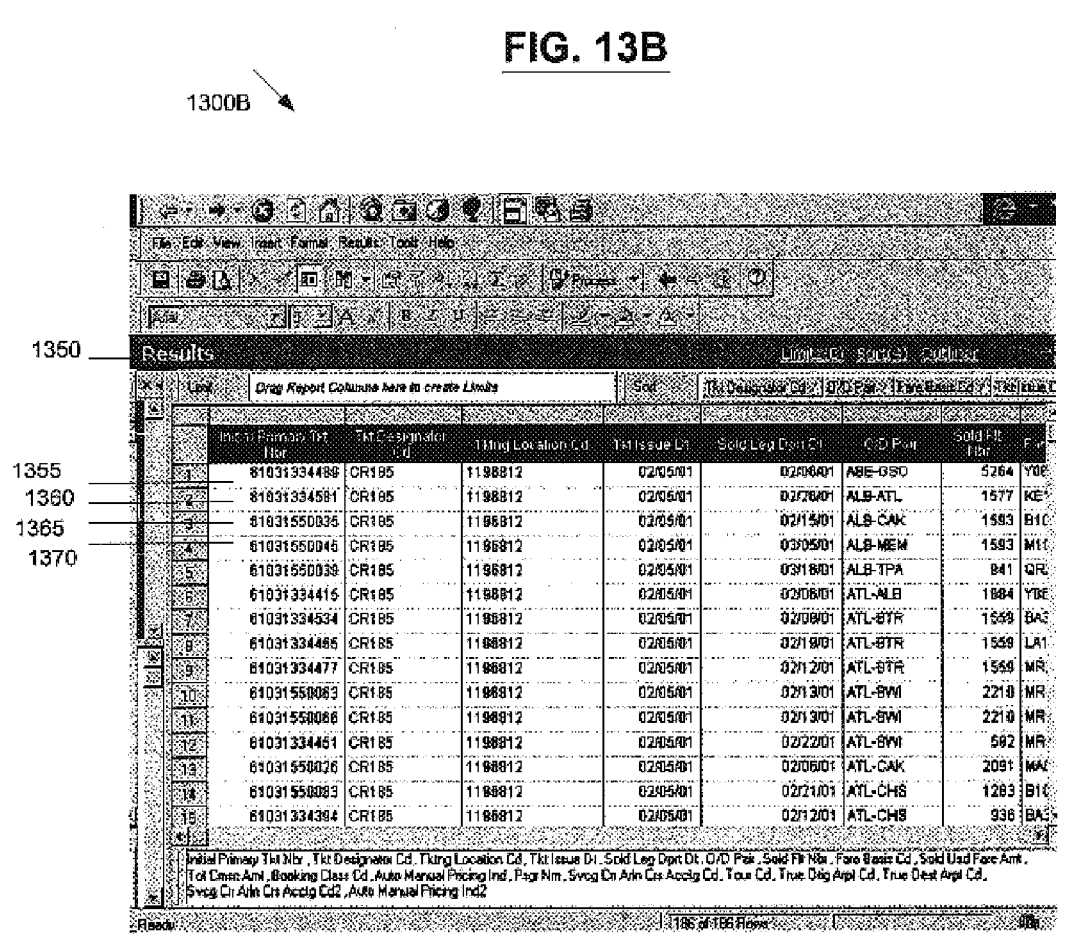

FIG. 13B is an exemplary display screen 1300B illustrating a representative example of the tickets pulled by the Possible Error Query. The tickets that the Possible Error Query in the example found are listed on the screen shot in FIG. 13, and include: #89 1355, #81 1360, #35 1365, and #45 1370. These tickets are the Possible Error Tickets.

Figure 14:
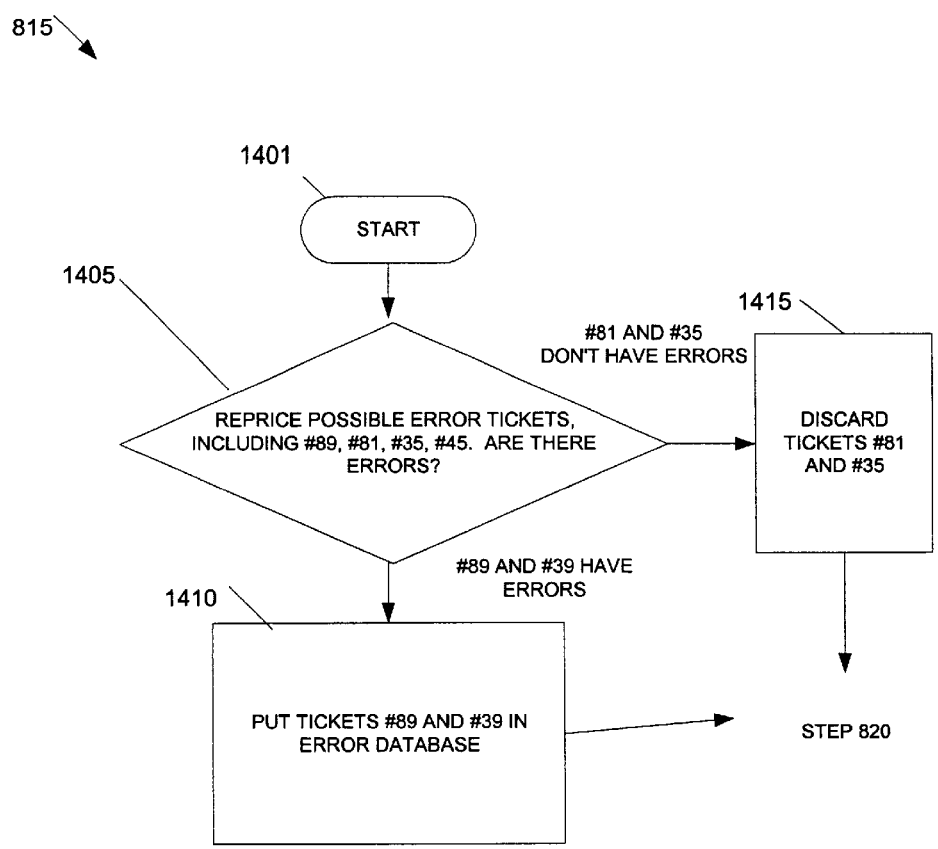
FIG. 14 is a logical flowchart diagram illustrating a repricing of the Possible Error Tickets and the identification of the actual Error Tickets.

FIG. 14 is a logical flowchart diagram illustrating a representative example where the Possible Error Tickets are repriced and the actual Error Tickets #89 and #45 are identified. Turning now to FIG. 14, the exemplary process 815 is initiated at the START step 1401. In step 1405, the user accesses the workstation 140 to reprice the Possible Error Tickets, which include #89, #81, #35, and #45. It is found that Possible Error Tickets #89 and #45 have errors. An error is defined as a ticket whose actual price was less than the correct price. Ticket #89 was $256 less than the actual price. Ticket #45 was $150 less than the correct price. Thus, Possible Error Tickets #89 and #45 are errors. In step 1410, the user accesses the workstation 140 to put the Error Tickets #89 and #45 in the Error Database 130. In step 1415, the user accesses the workstation 140 to discard tickets #81 and #35. The process then moves to step 820 of FIG. 8.

FIG. 15 is a logical flowchart diagram illustrating a representative example where a detailed invoice is prepared for Error Tickets #89 and #45. Turning now to FIG. 15, the exemplary process 820 is initiated at the START step 1501. In step 1505, the user accesses the workstation 140 and sends #89 and #45 from the Error Database 130 to the Invoice Database 135. In step 1510, the Invoice Database 135 prepares and sends the invoice. Thus, XYZ Travel Agency gets an invoice for the difference between the issued price and the audited price for the tickets #89 and #45. The process then moves to the "END" step 825.

FIG. 16 is a display screen 1600 illustrating an exemplary individual invoice record. This invoice record provides details needed to prove that a ticket was priced incorrectly. The Memo Number 1605, Memo Date 1610, and Agency Number or code 1615 are shown. The Ticket Number 1620, Date of Ticket Validation 1625, Report Period 1630, and Passenger 1635 are also shown. The Correct Computation 1640 for the flight segments can be added. The Comparison Computation 1645 can also be displayed. A Payment Stub 1650 is provided so that the agency or client can return the payment for the invoice. In an alternative exemplary embodiment, a copy of the original Passenger Ticket can also be provided.

What is claimed is:

1. A process for providing an audit with a transaction-based detail of errors in an environment with a high volume of transactions, comprising:

designing a Random Sample Query to pull a random sample of transactions from a Transaction Database;

running the Random Sample Query against the Transaction Database to find the random sample of transactions;

copying the random sample of transactions from the Transaction Database to a Random Sample Database, via a distributed computer network;

checking each transaction in the Random Sample Database to identify if the transaction has an error and to determine error parameters;

discarding the transaction if there is not an error;

copying the transaction from the Random Sample Database to an Error Database, via the distributed computer network, if there is an error;

obtaining at least one parameter of a random sample transaction containing an error from the random sample of transactions stored in the Random Sample Database;

obtaining Possible Error Transactions with at least one parameter identical to the at least one parameter of the random sample transaction containing the error;

checking the Possible Error Transactions to identify actual errors; and preparing a report detailing the actual errors in the Possible Error Transactions.

2. The process of claim 1, wherein copying the transactions from the Random Sample Database to the Error Database, via the distributed computer network, if there is an error, further comprises:

grouping the transaction having an error, in the Error Database based on the at least one identical parameter.

3. The process of claim 1, wherein the step of obtaining Possible Error Transactions further comprises:

analyzing the at least one parameter of the random sample transaction containing the error to design a Possible Error Query for identifying the Possible Error Transactions maintained in a Transaction Database;

running the Possible Error Query against the Transaction Database to find the Possible Error Transactions; and copying the Possible Error Transactions from the Transaction Database to a Possible Error Database, via the distributed computer network.

4. The process of claim 1, wherein the step of checking the Possible Error Transactions to identify actual errors further comprises:

checking each Possible Error Transaction to identify if the transaction has an error;

discarding the Possible Error Transaction if there is not an error; and copying the Possible Error Transaction from a Possible Error Database to the Error Database, via the distributed computer network, if there is an error.

5. The process of claim 4, wherein copying the Possible Error Transactions from a Possible Error Database to the Error Database, if there is an error, further comprises:

grouping the Possible Error Transactions having the at least one identical parameter in the Error Database.

6. The process of claim 1, wherein the step of preparing a report detailing the actual errors in the Possible Error Transactions further comprises:

copying the actual errors to an Invoice Database, via the distributed computer network;

copying the errors from the Invoice Database to a report form; and displaying the report form.

7. A process for providing an audit with a ticket-based detail of errors for a collection of passenger ticket sales issued by an airline or travel agency community, comprising:

designing a Random Sample Query to pull a random sample of tickets from a Ticket Database comprising the collection of passenger ticket sales;

running the Random Sample Query against the Ticket Database to find the random sample of tickets;

copying the random sample of tickets from the Ticket Database to a Random Sample Database, via a distributed computer network;

checking each ticket in the Random Sample Database to identify if the ticket has an error and to determine error parameters;

discarding the ticket if there is not an error;

copying the ticket from the Random Sample Database to an Error Database, via the distributed computer network, if there is an error;

obtaining at least one parameter of a random sample ticket containing an error from the random sample of tickets;

obtaining from the collection of passenger ticket sales Possible Error Tickets with at least one parameter identical to the at least one parameter of at least one random sample ticket containing error information;

checking the Possible Error Tickets to identify actual errors; and preparing a report detailing the actual errors in the Possible Error Tickets.

8. The process of claim 7, wherein copying the ticket from the Random Sample Database to the Error Database, via the distributed computer network, if there is an error, further comprises:

grouping the tickets having at least one identical parameter, in the Error Database.

9. The process of claim 7, wherein the step of obtaining Possible Error Tickets further comprises:

analyzing the at least one parameter of the random sample ticket containing the error to design a Possible Error Query for identifying the Possible Error Tickets maintained in a Ticket Database comprising the collection of passenger ticket sales;

running the Possible Error Query against the Ticket Database to find the Possible Error Tickets; and copying the Possible Error Tickets from the Ticket Database to a Possible Error Database, via the distributed computer network.

10. The process of claim 7, wherein the step of checking the Possible Error Tickets to identify actual errors further comprises:

checking each Possible Error Ticket to identify if the Ticket has an error; and discarding the Possible Error Ticket if there is not an error; and copying the Possible Error Tickets from a Possible Error Database to the Error Database, via the distributed computer network, if there is an error.

11. The process of claim 10, wherein copying the Possible Error Tickets from the Possible Error Database to the Error Database, if there is an error, further comprises:

grouping the Possible Error Tickets having an error in the Error Database based on the at least one identical parameter.

12. The process of claim 7, wherein the step of preparing a report detailing the actual errors in the Possible Error Tickets comprises:

copying the actual errors to an Invoice Database, via the distributed computer network;

copying the actual errors from the Invoice Database to a report form; and displaying the report form.

* * * * *